(12) United States Patent
Ikeda et al.

(10) Patent No.: US 10,999,315 B2
(45) Date of Patent: May 4, 2021

(54) CONTROL DEVICE, MITIGATION SYSTEM, CONTROL METHOD, AND COMPUTER PROGRAM

(71) Applicant: NTT Communications Corporation, Chiyoda-ku (JP)

(72) Inventors: Kento Ikeda, Tokyo (JP); Yasuhiro Hataya, Ichikawa (JP); Takanori Mizuguchi, Tokyo (JP); Kaname Nishizuka, Tokyo (JP)

(73) Assignee: NTT Communications Corporation, Chiyoda-ku (JP)

( * ) Notice: Subject to any disclaimer, the term of this patent is extended or adjusted under 35 U.S.C. 154(b) by 0 days.

(21) Appl. No.: 16/075,021

(22) PCT Filed: Jan. 31, 2017

(86) PCT No.: PCT/JP2017/003399
§ 371 (c)(1),
(2) Date: Aug. 2, 2018

(87) PCT Pub. No.: WO2017/135246
PCT Pub. Date: Aug. 10, 2017

(65) Prior Publication Data
US 2019/0044972 A1    Feb. 7, 2019

(30) Foreign Application Priority Data

Feb. 2, 2016    (JP) .............................. JP2016-018191

(51) Int. Cl.
*G06F 12/14*     (2006.01)
*H04L 29/06*    (2006.01)
(Continued)

(52) U.S. Cl.
CPC .......... *H04L 63/1441* (2013.01); *G06F 13/00* (2013.01); *G06F 21/55* (2013.01);
(Continued)

(58) Field of Classification Search
USPC ............................... 726/22–25; 713/187–189
See application file for complete search history.

(56) References Cited

U.S. PATENT DOCUMENTS 5,850,516 A * 12/1998 Schneier ................. G06F 21/57
726/25
7,359,962 B2 * 4/2008 Willebeek-LeMair ......................
H04L 29/06
709/223

(Continued)

FOREIGN PATENT DOCUMENTS

| CN | 104519049 A | 4/2015 |
| JP | 2003-85139 A | 3/2003 |

(Continued)

OTHER PUBLICATIONS

International Search Report dated Mar. 7, 2017 in PCT/JP2017/003399 filed Jan. 31, 2017.

(Continued)

*Primary Examiner* — Amare F Tabor
(74) *Attorney, Agent, or Firm* — Oblon, McClelland, Maier & Neustadt, L.L.P.

(57) ABSTRACT

A mitigation system comprises a plurality of types of mitigation devices which execute a defense function against an attack, and a control device which selects, if it is detected that an attack has been performed on a network to be monitored, one of the plurality of types of mitigation devices, which executes a defense function in accordance with the type of the attack.

5 Claims, 4 Drawing Sheets

(51) Int. Cl.
    *H04L 12/66*     (2006.01)
    *H04M 3/00*     (2006.01)
    *G06F 21/55*     (2013.01)
    *G06F 13/00*     (2006.01)
    *H04L 12/851*     (2013.01)
    *H04W 12/121*     (2021.01)

(52) U.S. Cl.
    CPC .......... *H04L 12/66* (2013.01); *H04L 63/1458* (2013.01); *H04M 3/00* (2013.01); *H04L 47/2483* (2013.01); *H04L 63/1466* (2013.01); *H04W 12/121* (2021.01)

(56) References Cited

U.S. PATENT DOCUMENTS

| | | | |
|---|---|---|---|
| 7,987,493 B1* | 7/2011 | Reams, III | H04L 63/1458 726/1 |
| 8,261,355 B2* | 9/2012 | Rayes | H04L 63/145 726/22 |
| 8,312,549 B2* | 11/2012 | Goldberg | G06Q 40/08 705/7.11 |
| 8,438,402 B2* | 5/2013 | Matsushima | G06F 21/554 713/189 |
| 8,516,594 B2* | 8/2013 | Bennett | G06F 21/577 713/188 |
| 8,555,393 B2* | 10/2013 | Davis | G06F 21/577 726/25 |
| 8,661,536 B2* | 2/2014 | Shumow | G06F 21/556 380/2 |
| 8,819,821 B2* | 8/2014 | Ansari | H04L 63/1416 726/11 |
| 8,832,831 B2* | 9/2014 | Chesla | H04L 63/1458 726/22 |
| 8,850,565 B2* | 9/2014 | Patrick | H04L 63/1441 726/22 |
| 10,042,354 B2* | 8/2018 | Chand | G06F 21/54 |
| 10,509,909 B2* | 12/2019 | Andriani | G06F 21/55 |
| 2002/0083175 A1 | 6/2002 | Afek et al. | |
| 2004/0236966 A1* | 11/2004 | D'Souza | H04L 29/06 726/13 |
| 2007/0143841 A1 | 6/2007 | Kurakami et al. | |
| 2013/0263256 A1* | 10/2013 | Dickinson | H04L 63/1416 726/22 |
| 2013/0269031 A1 | 10/2013 | Nakao et al. | |
| 2013/0346603 A1 | 12/2013 | Beyene | |
| 2015/0096020 A1 | 4/2015 | Adams et al. | |
| 2016/0315962 A1 | 10/2016 | Adams et al. | |
| 2017/0302699 A1 | 10/2017 | Adams et al. | |
| 2017/0324766 A1* | 11/2017 | Gonzalez Granadillo | H04L 63/20 |

FOREIGN PATENT DOCUMENTS

| | | |
|---|---|---|
| JP | 2006-67078 A | 3/2006 |
| JP | 2007-336220 A | 12/2007 |
| JP | 2010-26547 A | 2/2010 |

OTHER PUBLICATIONS

Extended European Search Report dated Jun. 17, 2019 in European Patent Application No. 17747402.0, citing documents AA through AD and AO therein. 7 pages.

* cited by examiner

FIG. 2
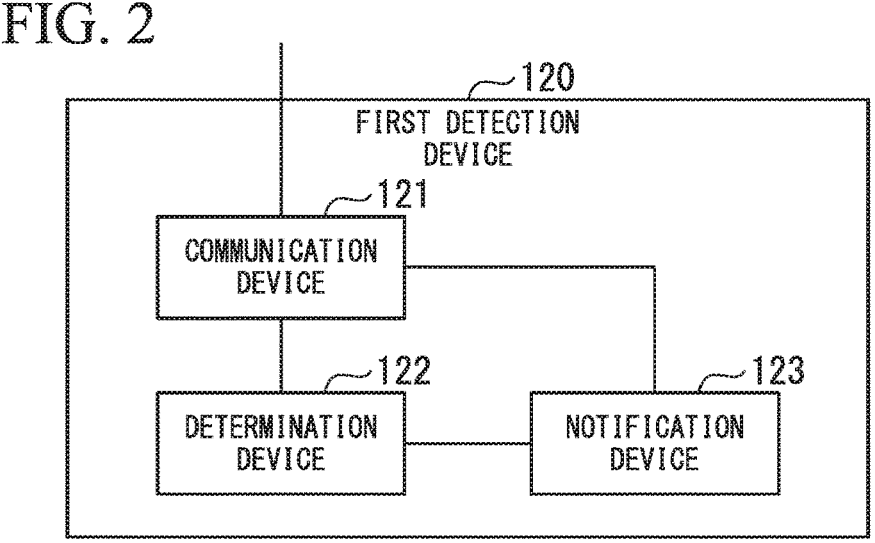
FIG. 3
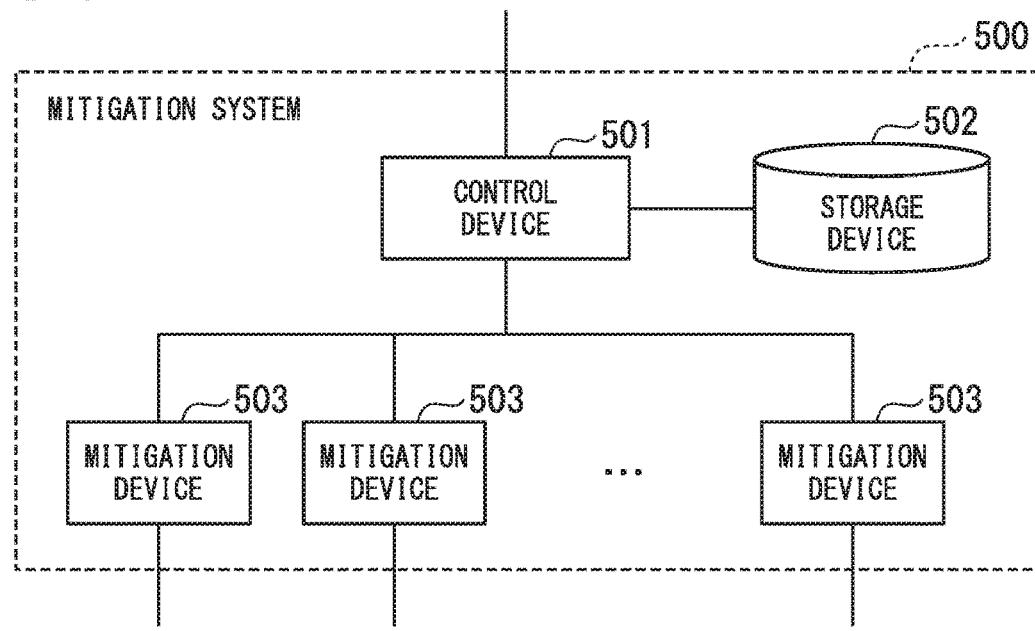
FIG. 4
| TYPE OF ATTACK | RELAY TARGET MITIGATION DEVICE |
|---|---|
| HTTP Get flood | A |
| TCP SYN flood | C |
| ⋮ | ⋮ |

FIG. 6

| MONITORING TARGET | TYPE OF ATTACK | RELAY TARGET MITIGATION DEVICE |
|---|---|---|
| FIRST NETWORK | HTTP Get flood | A |
| SECOND NETWORK | HTTP Get flood | B |
| FIRST NETWORK | TCP SYN flood | C |
| ⋮ | ⋮ | ⋮ |

CONTROL DEVICE, MITIGATION SYSTEM, CONTROL METHOD, AND COMPUTER PROGRAM

TECHNICAL FIELD

The present invention relates to a technology of reducing the influence of an attack performed on a communication apparatus.

Priority is claimed on Japanese Patent Application No. 2016-018191, filed on Feb. 2, 2016, the content of which is incorporated herein by reference.

BACKGROUND ART

There is a technology of performing an attack on a communication apparatus connected to a network. As an example of an attack technology, there is an attack (hereinafter, simply referred to as an attack) which makes it difficult to provide a service to a communication apparatus subjected to an attack. As specific examples of the attack, there are Denial of Service attacks and Distributed Denial of Service attacks. As a defense technology against DDoS attacks, there is a technology of reducing a communication load by introducing traffic transmitted from an attack source communication device to a specific device (hereinafter, referred to as a "mitigation device," "Mitigation" means "mitigation"). In addition, a technology for selecting different defense methods for DoS attacks and DDoS attacks has been proposed (for example, refer to Patent Literature 1).

CITATION LIST

Patent Literature

[Patent Literature 1]
Japanese Unexamined Patent Application, First Publication No. 2006-67078

SUMMARY OF INVENTION

Technical Problem

There are various types of attack. For example, there are various types of DDoS attack according to an implementation method or the like. On the other hand, there are a plurality of types of mitigation devices. There are strong and weak points according to the type of attack in each type of mitigation device. For this reason, a defense may not be able to be effectively realized according to a combination of a type of adopted mitigation device and a type of attack being performed in some cases.

In view of the above circumstances, an object of the present invention is to provide a technology capable of more effectively performing a defense against an attack.

Solution to Problem

According to one aspect of the present invention, there is a control device which selects, if it is detected that an attack has been performed on a network to be monitored, one of a plurality of types of mitigation devices, which is a device executing a defense function against the attack in accordance with the type of the attack.

According to one aspect of the present invention, there is a mitigation system which comprises mitigation devices of a plurality of types each executing a defense function against an attack, and a control device selecting, if it is detected that an attack has been performed on a network to be monitored, one of the plurality of types of mitigation devices, which executes a defense function in accordance with the type of the attack.

According to one aspect of the present invention, in the mitigation system, the control device selects the mitigation device which executes a defense function in accordance with a combination of the type of the attack and the network to be monitored.

According to one aspect of the present invention, in the mitigation system, the control device receives a notification of the type of attack performed on a network to be monitored from a detection device which is installed on the network to be monitored and detects that an attack has been performed on the basis of communication relayed to the network to be monitored.

According to one aspect of the present invention, the mitigation system described above further comprises a storage device which stores the type of the attack against which the defense is executed in correlation with each network to be monitored, in which, if it is detected that an attack has been performed on a network to be monitored, the control device instructs a selected mitigation device to execute a defense only when the attack is a type of attack against which the defense is executed on the network to be monitored.

According to one aspect of the present invention, the mitigation system described above further comprises a storage device which stores a cost charged for the network to be monitored when the defense function is executed in correlation with the type of the attack, in which the control device calculates a cost for executing the defense function in accordance with the type of the attack against which the defense function is executed by referring to the cost stored in the storage device.

According to one aspect of the present invention, the mitigation system described above further comprises a storage device which stores an operator who operates the mitigation device and the type of the attack in correlation with each network to be monitored, in which the control device selects, if it is detected that the attack has been performed on the network to be monitored, the mitigation device operated by the operator stored in correlation with the type of the attack on the network to be monitored, and instructs the selected mitigation device to execute a defense.

According to one aspect of the present invention, the mitigation system described above further comprises a storage device which stores a cost charged for the network to be monitored when the defense function is executed in correlation with the type of the attack for each operator who operates the mitigation device, in which the control device calculates a cost for executing the defense function in accordance with the type of the attack against which the defense function is executed and the operator who operates a mitigation device by referring to a cost stored in the storage device.

According to another aspect of the present, there is a control method comprising a step of selecting, if it is detected that an attack has been performed on a network to be monitored, one of a plurality of types of mitigation devices, which is a device executing a defense function against the attack in accordance with the type of the attack.

According to still another aspect of the present invention, there is a computer program which causes a computer to execute a step of selecting, if it is detected that an attack has been performed on a network to be monitored, one of a plurality of types of mitigation devices, which is a device executing a defense function against the attack in accordance with the type of the attack.

Advantageous Effects of Invention

According to the present invention, it is possible to more effectively perform a defense against an attack.

BRIEF DESCRIPTION OF DRAWINGS

FIG. 2 is a schematic block diagram which shows a functional configuration of a first detection device 120.

FIG. 3 is a schematic block diagram which shows a functional configuration of a mitigation system 500.

FIG. 4 is a diagram which shows a specific example of a determination reference table.

FIG. 6 is a diagram which shows a modification example of a determination reference table.

DESCRIPTION OF EMBODIMENTS

Figure 1:
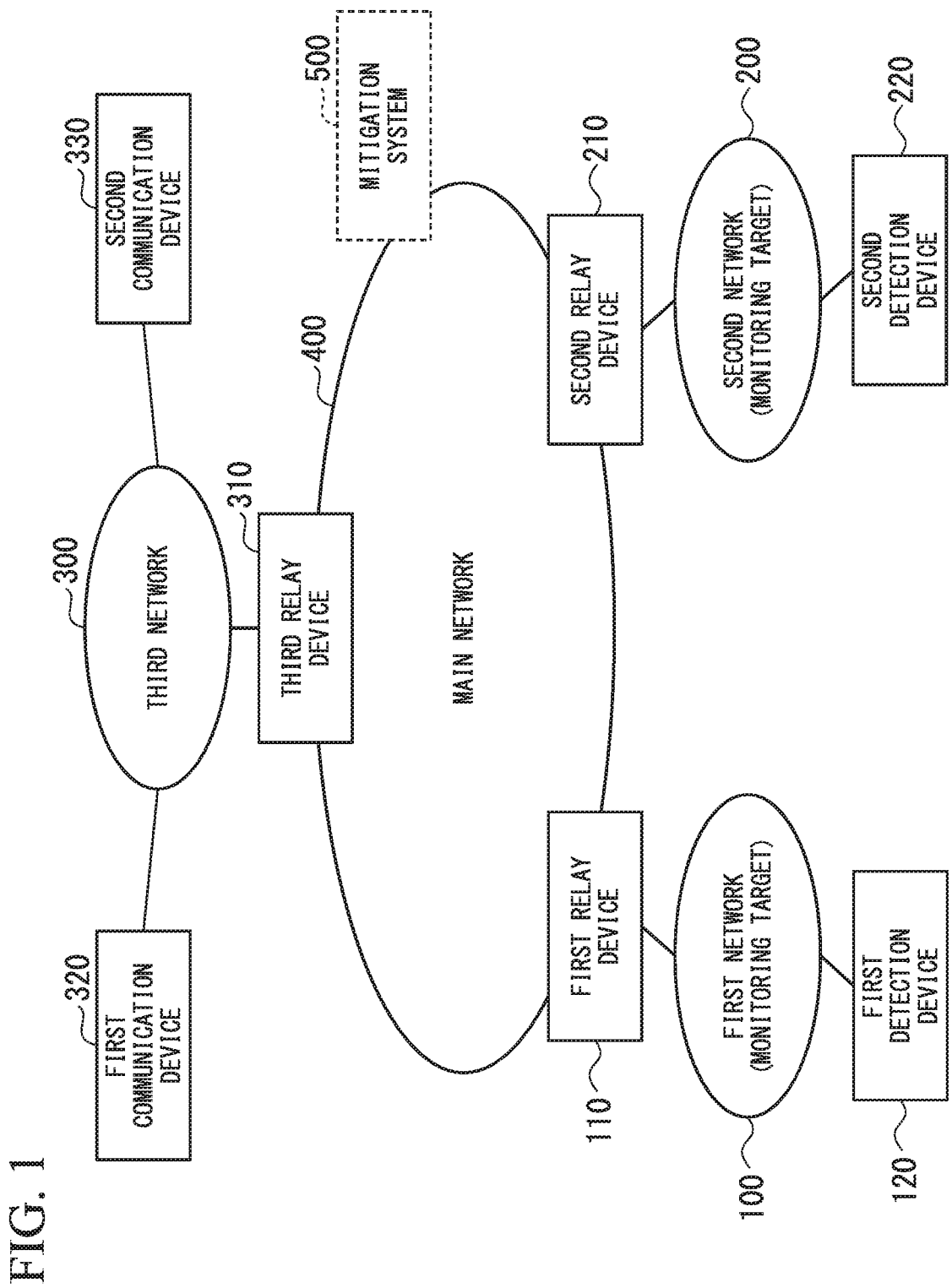
FIG. 1 is a system configuration diagram which shows a configuration of a communication system including a mitigation system.

FIG. 1 is a system configuration diagram which shows a system configuration of a communication system including a mitigation system. The communication system shown in FIG. 1 includes a first network 100, a first relay device 110, a first detection device 120, a second network 200, a second relay device 210, a second detection device 220, a third network 300, a third relay device 310, a first communication device 320, a second communication device 330, a main network 400, and a mitigation system 500.

The first network 100 is a network to be monitored by the mitigation system 500. When an attack has been performed on the first network 100, a defense is executed by the mitigation system 500. The first detection device 120 is connected to the first network 100. The first detection device 120 receives communication information from the first relay device 110. The first detection device 120 determines whether an attack has been performed on the first network 100 and detects an attack by analyzing the received communication information.

The second network 200 is a network to be monitored by the mitigation system 500. When an attack has been performed on the second network 200, a defense is executed by the mitigation system 500. The second detection device 220 is connected to the second network 200. The second detection device 220 receives communication information from the second relay device 210. The second detection device 220 determines whether an attack has been performed on the second network 200 and detects an attack by analyzing the received communication information.

The third network 300 is a network not to be monitored by the mitigation system 500. The third network 300 is, for example, an unspecified Internet Protocol (IP) network. The first communication device 320 and the second communication device 330 are connected to the third network 300. The first communication device 320 and the second communication device 330 are specific examples of an unspecified communication device connected to the third network 300. Hereinafter, the first communication device 320 and the second communication device 330 will be described as specific examples of a device for performing an attack on the first network 100 or the second network 200.

The main network 400 includes the first relay device 110, the second relay device 210, and the third relay device 310 as gateways. The first network 100 is connected to the main network 400 via the first relay device 110. The second network 200 is connected to the main network 400 via the second relay device 210. The third network 300 is connected to the main network 400 via the third relay device 310. The main network 400 may be, for example, a network managed by an operator (a carrier) that provides the first network 100 and the second network 200 with a connection service to an unspecified IP network.

The mitigation system 500 is connected to the main network 400. The mitigation system 500 provides a network to be monitored (for example, the first network 100 and the second network 200) with a function of defense against an attack.

FIG. 2 is a schematic block diagram which shows a functional configuration of the first detection device 120. The first detection device 120 is configured using an information processing device such as a blade server, a workstation, or a personal computer. The first detection device 120 includes a Central Processing Unit (CPU), a memory, an auxiliary storage device, and the like connected by a bus. The first detection device 120 functions as a device including a communication device 121, a determination device 122, and a notification device 123 by executing a detection program. All or some of respective functions of the first detection device 120 may also be realized using hardware such as an application specific integrated circuit (ASIC), a programmable logic device (PLD), or a field programmable gate array (FPGA). The detection program may be recorded on a computer readable recording medium. The computer readable recording medium is, for example, a portable medium such as a flexible disk, a magneto-optical disk, a ROM, a CD-ROM, or a semiconductor storage device (for example, a solid state drive (SSD)), or a storage device such as a hard disk or a semiconductor storage device embedded in a computer system. The detection program may be transmitted via an electronic communication line.

The communication device 121 is constituted using a communication apparatus such as a communication interface. The communication device 121 may perform wired communication or wireless communication. The communication device 121 communicates with the first relay device 110 and the mitigation system 500. The communication device 121 receives, for example, communication information from the first relay device 110. The communication information is information on communication relayed by the first relay device 110. The communication information may also include, for example, information on a packet relayed by the first relay device 110. The communication device 121 transmits, for example, attack information generated by the notification device 123 to the mitigation system 500. The attack information includes information on an attack performed on the first network 100.

The determination device 122 determines whether an attack has been performed on the first network 100 to be monitored on the basis of communication information received from the first relay device 110. For example, a flow technology which is one of traffic analysis technologies may also be applied to the determination device 122. As a specific example of a detected attack, there is an attack (a high load attack) which makes it difficult to provide a service by applying an excessive load to a communication apparatus. Examples of more specific attacks include DDoS attacks such as DoS attacks, HTTP Get flood, or TCP SYN flood. When an attack has been performed, the determination device 122 determines a type of the attack being performed. The determination device 122 notifies the notification device 123 of a result of the determination.

The notification device 123 notifies the mitigation system 500 of details of the determination in accordance with a result of the determination performed by the determination device 122. For example, the notification device 123 generates attack information including the type of attack performed on the first network 100, and information indicating a network to be attacked (for example, the first network 100). As the information indicating a network to be attacked, information indicating an address space of the network may be used, or identification information such as names or numbers assigned to the network in advance may be used. The notification device 123 notifies the mitigation system 500 of the details of the determination by transmitting the generated attack information to the mitigation system 500.

The description of the first detection device 120 is completed as described above. The second detection device 220 has the same configuration as the first detection device 120. However, a network to be monitored by the second detection device 220 is the second network 200 instead of the first network 100.

FIG. 3 is a schematic block diagram which shows a system configuration of the mitigation system 500. The mitigation system 500 includes a control device 501, a storage device 502, and a plurality of mitigation devices 503.

The control device 501 is constituted using an information processing device such as a blade server, a workstation, or a personal computer. The control device 501 includes a CPU, a memory, an auxiliary storage device, and the like connected by a bus. The control device 501 functions according to a mitigation control program being executed. The control device 501 determines to which mitigation device 503 attack communication needs to be relayed on the basis of attack information received from a detection device (for example, the first detection device 120 or the second detection device 220).

The storage device 502 is a storage device such as a magnetic hard disk device or a semiconductor storage device. The storage device 502 stores a determination reference table. The determination reference table is a table indicating criteria to be used when the control device 501 performs determination processing. FIG. 4 is a diagram which shows a specific example of the determination reference table. The determination reference table has information on a relay target mitigation device in correlation with the type of attack. The relay target mitigation device is information indicating to which mitigation device 503 attack communication needs to be relayed. For example, it is shown in a record in a top row of FIG. 4 that attack communication is relayed to a mitigation device A when an HTTP Get flood attack is performed. For example, it is shown in a record in a second row of FIG. 4 that attack communication is relayed to a mitigation device C when a TCP SYN flood attack is performed. Such a table is constructed because a defense function of the mitigation device A is effective against an HTTP Get flood attack and a defense function of the mitigation device C is effective against a TCP SYN flood attack. In this manner, a mitigation device 503 which effectively exerts a defense function against each type of attack is registered in the table as a relay target mitigation device.

Returning to the description of FIG. 3, the mitigation device 503 is a device which executes a defense function (a function of stopping an attack) against attack communication. The mitigation device 503 executes route control for receiving attack communication using the device itself if an instruction to execute defense processing is received from the control device 501. Such route control may be performed using, for example, a border gateway protocol (BGP). The mitigation device 503 may also perform route control by notifying a relay device in the main network 400 of, for example, information indicating communication to be received by the device itself (hereinafter, referred to as "communication identification information") and destination information of the device itself which is a target relay destination of communication. Such route control may also be performed on a relay device which is an inflow source of attack communication (the third relay device 310 in the present embodiment).

The mitigation device 503 executes a defense function if a packet of attack communication is received after the route control described above. The mitigation device 503 executes the defense function by, for example, discarding the packet of attack communication. The mitigation device 503 executes the defense function in a plurality of methods. For this reason, there are a case in which defense can be effectively performed and a case in which defense cannot be effectively performed in accordance with a combination of the type of attack and a defense function adopted by the mitigation device 503. For example, the defense function adopted by the mitigation device A can effectively perform defense against an HTTP Get flood but cannot effectively perform defense against a TCP SYN flood. For example, the defense function adopted by the mitigation device C can effectively perform defense against a TCP SYN flood but cannot effectively perform defense against an HTTP Get flood.

Figure 5:
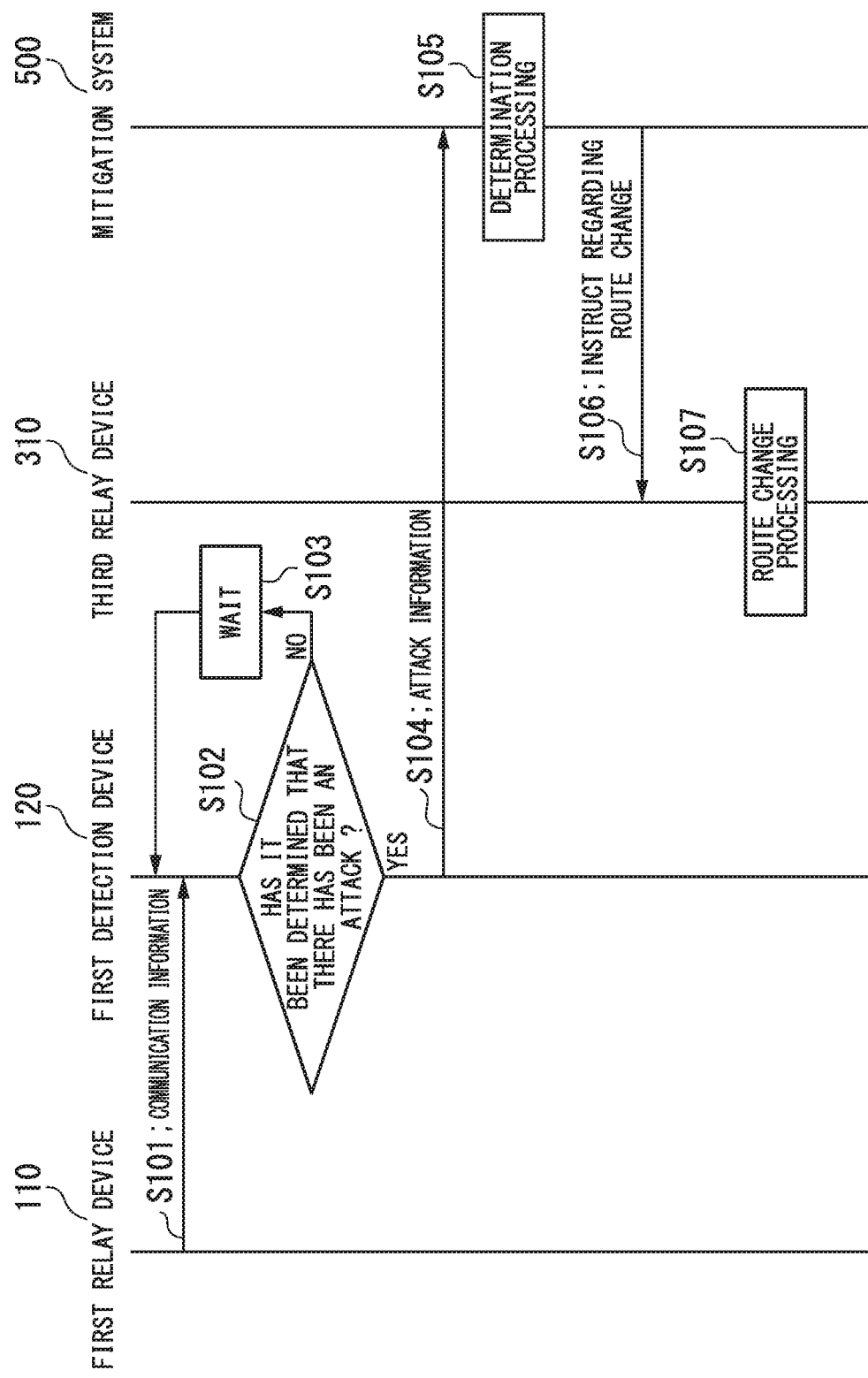
FIG. 5 is a sequence chart which shows a flow of processing in the communication system.

FIG. 5 is a sequence chart which shows a flow of processing in the communication system. In an example of FIG. 5, it is assumed that an attack has been performed on a communication device connected to the first network 100 among the first communication device 320 and the second communication device 330 connected to the third network 300.

The first relay device 110 transmits information on communication relayed to the first network 100 to be monitored (communication information) to the first detection device 120 when a predetermined timing arrives (step S101). The predetermined timing may be a timing arriving at fixed time intervals (for example, every second, every minute, every 5 minutes, and the like), may be a timing at which a predetermined condition for communication is satisfied (for example, a timing at which the amount of communication relayed to the first network 100 exceeds a threshold value), or may be another timing.

The determination device 122 of the first detection device 120 receives the communication information. The first detection device 120 determines whether an attack has been performed on the basis of the received communication information (step S102). When it is determined that an attack has not been performed (NO in step S102), the determination device 122 waits until next communication information is received (step S103). When the next communication information is received, the determination device 122 executes the processing of step S102 for the received communication information.

On the other hand, when it is determined that an attack has been performed (YES in step S102), the determination device 122 generates attack information. The determination device 122 passes the generated attack information to the notification device 123. The notification device 123 transmits the generated attack information to the mitigation system 500 (step S104).

The control device 501 of the mitigation system 500 receives the attack information from the first detection device 120. The control device 501 executes determination processing on the basis of the received attack information (step S105). The control device 501 selects a mitigation device 503 in accordance with the type of attack performed on the first network 100 by executing the determination processing. The control device 501 instructs the selected mitigation device 503 to execute the defense function. The mitigation device 503 which is instructed to execute the defense function transmits a route change instruction to a relay device in the main network 400 to relay attack communication to the device itself (step S106). In the example of FIG. 5, the selected mitigation device 503 instructs the third relay device 310 to change a route to relay communication transmitted from the first communication device 320 and the second communication device 330 to the first network 100 to the device itself. The third relay device 310 which receives a route change instruction executes route control to relay the communication transmitted from the first communication device 320 and the second communication device 330 to the first network 100 to the mitigation device 503 (step S107). The execution of route control may be realized, for example, using the BGP as described above. After the route control is executed, the communication (attack communication) transmitted from the first communication device 320 and the second communication device 330 to the first network 100 is relayed to the mitigation device 503.

According to the mitigation system 500 constituted as described above, it is possible to more effectively perform defense against an attack in a system using a plurality of types of mitigation devices. Specifically, this is as follows. A plurality of types of mitigation devices 503 are installed in the mitigation system 500. Each type of mitigation device 503 has a type of attack which can be more effectively defended against than in other mitigation devices 503 in accordance with differences in types of defense functions thereof. In the mitigation system 500, the control device 501 selects a mitigation device 503 which can more effectively perform defense in accordance with the type of attack performed on a target to be monitored. Then, the selected mitigation device 503 executes the defense function. For this reason, it is possible to more effectively perform defense against an attack.

In addition, according to the mitigation system 500, a detection device which determines whether an attack has been performed on a network to be monitored (for example, the first detection device 120 and the second detection device 220), and the control device 501 and the mitigation device 503 which realize the defense function are disposed apart from each other. More specifically, the detection device is disposed on the network to be monitored, and the control device 501 and the mitigation device 503 which realize the defense function are disposed in the main network 400. With such a configuration, it is not necessary to dispose the control device 501 and the mitigation device 503 which realize the defense function for each network to be monitored. For this reason, even if the number of networks to be monitored increases, it is possible to realize defense by installing more detection devices. Therefore, it is possible to reduce costs and labor incurred due to an increase in number of networks to be monitored, and to provide a monitoring service of a larger size.

In addition, with the configuration described above, an administrator of the mitigation system 500 can select a mitigation device 503. Moreover, the administrator of the mitigation system 500 can also conceal a mitigation device 503 being used for an administrator of the network to be monitored.

In addition, with the configuration described above, a provider of mitigation services of the mitigation system 500 can provide mitigation services to an administrator of a network to be monitored (a person who is provided with mitigation services) in accordance with the type of attack. For example, the provider of mitigation services may choose whether or not to receive mitigation services of the mitigation device 503, which is appropriate for a type of attack, for each type of attack. In this case, the storage device 502 stores a table indicating the type of attack against which a mitigation service may be executed for each network to be monitored. The control device 501 executes a defense against an attack on a network to be monitored in which the attacked is detected when the type of the detected attack is stored in the table. On the other hand, the control device 501 does not execute a defense against an attack even if the attack has been performed on a network to be monitored in which the attack is detected when the type of the detected attack is not stored in the table.

The provider of mitigation services may also set different service usage charges for each type of attack that can be defended. For example, 100 yen may be set as a cost for each defense being performed for an HTTP Get flood, and 50 yen may be set as a cost for each defense being performed for a TCP SYN flood. These costs may be set to different values for each person receiving mitigation services. These costs are stored in the storage device 502 in advance for each type of attack. The control device 501, if a mitigation service (a defense function) is executed, calculates a cost charged for a network to be monitored in accordance with the type of attack against which the mitigation service is executed on the basis of a storage content of the storage device 502.

Mitigation devices 503 operated by a plurality of operators may be connected to the main network 400. In this case, the administrator of a network to be monitored may be able to select one of the mitigation devices 503 operated by a plurality of operators to receive a mitigation service of the mitigation device 503. In this case, it may be possible to receive mitigation services by different operators for each type of attack. In this case, the storage device 502 stores a table that shows the type of attack against which a mitigation service is executed and an operator providing a mitigation service for a corresponding type of attack in correlation with each network to be monitored. The control device 501 selects a mitigation device 503 which executes a defense and instructs the mitigation device 503 regarding a route change on the basis of the table. For example, an operator A of a mitigation service may set 100 yen as a cost for each defense being performed and an operator B of a mitigation service may set 200 yen as a cost for each defense being performed for an HTTP Get flood. For example, the operator A of a mitigation service may set 50 yen as a cost for each defense being performed and the operator R of a mitigation service may set 70 yen as a cost for each defense being performed for a TCP SYN flood. These costs may be set to different values for each person receiving a mitigation service. These costs are stored in the storage device 502 in advance for each operator and each type of attack. The control device 501, if a mitigation service (a defense function) is executed, calculates a cost charged for a network to be monitored in accordance with the type of attack against which the mitigation service is executed and an operator who executes the mitigation service on the basis of the storage content of the storage device 502.

In general, an access line has a narrower bandwidth than a backbone. For this reason, there is a problem that a defense may not be properly performed when lines are congested due to an attack in a method of introducing attack communication to a mitigation device 503 for each user in an area close to the access line (a network to be monitored). In response to such a problem, a mitigation device 503 is selected using a criterion different from a network distance between a network to be attacked (the first network 100 in the example of FIG. 5) and the mitigation device 503 in the mitigation system 500. For this reason, the introduction to a mitigation device 503 is realized in an area closer to the backbone. As a result, it is possible to solve the above problem.

In addition, the mitigation device 503 is disposed in the main network (a backup network) in the embodiment described above. For this reason, it is possible to introduce attack communication to the mitigation device 503 on a network whose bandwidth is wider than a case in which the mitigation device 503 is disposed on a network to be monitored (an access line network). The above problem can also be solved based on this point of view.

[Modification]

The control device 501 may further select a mitigation device 503 on the basis of a load status of processing occurring in each mitigation device 503 in addition to the type of attack. For example, when there are a plurality of mitigation devices 503 which can effectively perform defense against a certain type of attack, one or a plurality of mitigation devices 503 may be selected in an ascending order of load at the time of selection.

FIG. 6 is a diagram which shows a modification of the determination reference table. The determination reference table shown in FIG. 6 has information of a relay target mitigation device in correlation with the combination of a network to be monitored and the type of attack. For example, it is shown in a record in a top row of FIG. 6 that attack communication is relayed to the mitigation device A when an HTTP Get flood attack has been performed on the first network 100. It is shown in a record in a second row of FIG. 6 that attack communication is relayed to the mitigation device B when an HTTP Get flood attack has been performed on the second network 200. Such a table is constructed, for example, when the administrator of the first network 100 selects the mitigation device A as a defense function against an HTTP Get flood and the administrator of the second network 200 selects the mitigation device B as a defense function against an HTTP Get flood. For example, when the mitigation device A has high performance but has an expensive usage charge, and the mitigation device B is inferior to the mitigation device A in function but has an inexpensive set usage charge, the administrator of each network may select a mitigation device or a mitigation service (a service name concealing the name of a mitigation device) in an appropriate manner.

Although the embodiments of this invention have been described above in detail with reference to drawings, a specific configuration is not limited to these embodiments, and various designs and the like within a scope not departing the gist of the invention are also included.

INDUSTRIAL APPLICABILITY

This can be applied to devices and systems affected by an attack performed on a communication apparatus.

REFERENCE SIGNS LIST

100 First network
110 First relay device
120 First detection device
121 Communication device
122 Determination device
123 Notification device
200 Second network
210 Second relay device
220 Second detection device
300 Third network
310 Third relay device
320 First communication device
330 Second communication device
400 Main network
500 Mitigation system
501 Control device
502 Storage device
503 Mitigation device

The invention claimed is:

1. A mitigation system comprising:
a plurality of types of mitigation devices which execute a defense function against an attack; and
a control device which selects, if it is detected that an attack has been performed on a network to be monitored, one or more mitigation devices among the plurality of types of mitigation devices, which execute a defense function in accordance with the type of the attack, in an ascending order of load based on load statuses of processing occurring in the one or more mitigation devices;
wherein the defense functions mounted in the plurality of types of mitigation devices are different respectively for different types of attacks which are predetermined from a group of different attacks which include at least an HTTP Get flood attack or a TCP SYN flood attack;
the control device selects the one or more mitigation devices which execute a defense function in accordance with a combination of the type of the attack and the network to be monitored.

2. The mitigation system according to claim 1,
wherein the control device receives a notification of the type of attack performed on the network to be monitored from a detection device which is installed on the network to be monitored and detects that an attack has been performed on the basis of communication relayed to the network to be monitored.

3. A mitigation system comprising:
a plurality of types of mitigation devices which execute a defense function against an attack;
a control device which selects, if it is detected that an attack has been performed on a network to be monitored, one or more mitigation devices among the plurality of types of mitigation devices, which execute a defense function in accordance with the type of the attack, in an ascending order of load based on load statuses of processing occurring in the one or more mitigation devices; and a storage device which stores the type of the attack against which the defense is executed in correlation with each network to be monitored, wherein, the defense functions mounted in the plurality of types of mitigation devices are different respectively for different types of attacks which are predetermined from a group of different attacks which include at least an HTTP Get flood attack or a TCP SYN flood attack;

if it is detected that the attack has been performed on the network to be monitored, the control device instructs the selected one or more mitigation devices to execute a defense only when the attack is a type of attack against which the defense is executed on the network to be monitored.

4. A mitigation system comprising:

a plurality of types of mitigation devices which execute a defense function against an attack;

a control device which selects, if it is detected that an attack has been performed on a network to be monitored, one or more mitigation devices among the plurality of types of mitigation devices, which execute a defense function in accordance with the type of the attack, in an ascending order of load based on load statuses of processing occurring in the one or more mitigation devices; and a storage device which stores an operator who operates the mitigation device and the type of the attack in correlation with each network to be monitored, wherein the defense functions mounted in the plurality of types of mitigation devices are different respectively for different types of attacks which are predetermined from a group of different attacks which include at least an HTTP Get flood attack or a TCP SYN flood attack;

the control device selects, if it is detected that the attack has been performed on the network to be monitored, the one or more mitigation devices operated by the operator stored in correlation with the type of the attack on the network to be monitored, and instructs the selected one or more mitigation devices to execute a defense.

5. The mitigation system according to claim 1, wherein the group of different attacks include at least both of an HTTP Get flood attack and a TCP SYN flood attack.

* * * * *